Patented June 28, 1949

2,474,651

UNITED STATES PATENT OFFICE 2,474,651

BASIC-ALKYL ESTERS AND THEIR SALTS

Frederick F. Blicke, Washtenaw County, Mich., assignor to Regents of the University of Michigan, Ann Arbor, Mich., a corporation of Michigan No Drawing. Application February 26, 1944, Serial No. 524,084

8 Claims. (Cl. 260—294)

The present invention is directed to new basic-alkyl esters of para-xenyl-acetic acid and para-xenyl-acetic acids substituted with a hydrocarbon radical on the alpha carbon atom and salts thereof, and is particularly concerned with (a) esters having the formula

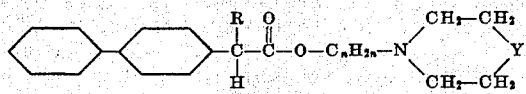

wherein R is hydrogen or hydrocarbon, Y is —CH₃—, —NH—, —S—, or —O—, and n is an integer from 2 to 4, inclusive, and (b) the acid salts thereof. Among the hydrocarbon radicals represented by "R" are lower alkyl, aryl, cycloalkyl, aralkyl, and alkenyl. The radicals represented by the grouping

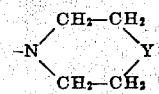

are piperidino, piperazino, thiomorpholino, and morpholino.

Members of this class of compounds have been prepared and found to have value as antispasmodics and as intermediates in the preparation of more complex organic derivatives. The free basic-alkyl esters of para-xenyl-acetic and substituted acetic acids are oily liquids readily soluble in many common organic solvents, difficultly soluble in water, and distilling with some decomposition at high temperatures and under reduced pressure. The acid salts of these basic-alkyl esters are solids at ordinary temperatures.

The compounds may be prepared by reacting a suitable acid, e. g. para-xenyl-acetic acid, alpha-(para-xenyl)-phenylacetic acid, alpha-(para-xenyl)-phenylpropionic acid, alpha-(para-xenyl)-cyclohexylacetic acid, alpha-(para-xenyl)-normalbutyric acid, or alpha-(para-xenyl)-normalhexenoic Δ-4 acid with a suitable basic-alkyl halide, such as beta-morpholino-ethyl chloride, beta-piperidino-ethyl chloride, gamma-piperidino-propyl bromide, beta-piperazino-ethyl iodide, delta-thiomorpholino-normalbutyl chloride, etc. This is conveniently accomplished by heating substantially equimolecular proportions of the acid and halide together, preferably in the presence of a low boiling organic solvent, e. g. isopropyl alcohol, butyl alcohol, benzene, etc., and thereafter evaporating the solvent under reduced pressure to obtain the reaction product as a residue. If desired, this residue may be fractionally recrystallized from a suitable solvent or solvent mixture. This procedure is productive of the hydrohalide of the basic-alkyl ester of the acid selected. The free ester may be obtained by treatment of this hydrohalide product with ammonia, sodium carbonate, or other suitable alkaline material. Salts other than the hydrohalides may be prepared from the free basic-alkyl esters by reaction with the corresponding acid or acid anhydride or by treatment of the hydrohalide with a selected salt of the desired acid to bring about double decomposition, but under such conditions as not to induce hydrolysis of the ester.

An alternate method for the preparation consists of reacting thionyl chloride with a selected para-xenyl-acetic acid to produce the corresponding acid chloride. The latter compound is reacted with an excess of a suitable basic-alkanol, e. g. beta-piperidino-ethanol, in an inert solvent such as benzene. This is conveniently carried out by heating the mixture to the boiling temperature of the solvent and under reflux for the period of time necessary to accomplish the reaction. Basic-alkanol hydrochloride may separate from the mixture and is recoverable by filtration. The filtrate from this operation may be evaporated under reduced pressure to separate the solvent and obtain the free basic-alkyl ester of the para-xenyl substituted acid. An alternate procedure comprises diluting the filtrate with a low boiling non-polar solvent, such as diethyl ether, and passing gaseous hydrogen halide therethrough to precipitate the basic-alkyl ester hydrohalide which may be separated and recrystallized. Where it is desired to produce salts other than the hydrohalides, the free basic-alkyl ester or the benzene solution thereof may be reacted with a suitable free acid, such as acetic acid, sulfuric acid, methyl sulfuric acid, etc., or an acid anhydride. The resulting salt compounds may be purified by recrystallization from alcohol and ether mixtures or other suitable solvent therefor.

The preferred embodiment of the invention consists of the hydrochlorides of the basic-alkyl esters formed according to the above methods. These compounds have the generic formula

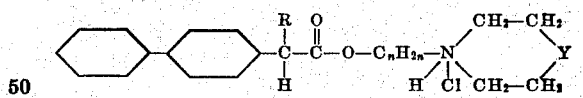

wherein R, Y and n have the values heretofore given. These hydrochlorides are high melting crystalline solids difficultly soluble in most organic solvents and soluble in water.

The para-xenyl-acetic acid and substituted acetic acids employed as reactants in the preparation of the compounds of the present invention are crystalline compounds of relatively high melting point. These acids may be synthesized by a number of different methods. Representative methods of preparation are set forth in the Journal of the American Chemical Society, volume 65, pages 1725–1727. Para-xenyl-acetic acid has a melting point of 161°–162° C. Alpha-(para-xenyl)-phenylacetic acid melts at 168°–170° C. Alpha-(para-xenyl)-cyclohexylacetic acid melts at 202°–203° C. Alpha-(para-xenyl)-propionic acid melts at 168°–169° C. Alpha-(para-xenyl)-normalbutyric acid melts at 175°–177° C. Alpha-(para-xenyl)-normalpentanoic acid melts at 142°–143° C. Alpha-(para-xenyl)-normalhexanoic acid melts at 178°–179° C. The basic-alkyl chlorides and basic-alkanols employed in the preparation of the new compounds are known derivatives.

The following examples illustrate the invention with respect to the preparation of certain of the basic-alkyl esters and their salts but are not to be construed as limiting:

Example 1

3.18 grams of para-xenyl-acetic acid, 2.23 grams of beta-piperidino-ethyl chloride, and 75 milliliters of isopropyl alcohol were mixed together and heated to boiling temperature and under reflux for 12 hours. The isopropyl alcohol was then distilled out of the mixture under reduced pressure, and the solid residue washed with dry ethyl ether and recrystallized from a diethyl ether-ethanol mixture. 2.56 grams of beta-piperidino-ethyl para-xenyl-acetate hydrochloride was thereby obtained as a crystalline compound melting at 163°–164° C.

Example 2

5.0 grams of alpha-(para-xenyl)-propionic acid, 3.9 grams of beta-piperidino-ethyl chloride, and 85 milliliters of isopropyl alcohol were heated together substantially as described in Example 1. Upon evaporation of the solvent of reaction, an oily residue was obtained. This crude product was dissolved in water, made alkaline with aqueous sodium carbonate solution, and extracted with ethyl ether. The ether extract was washed with water, dried over magnesium sulfate, and evaporated to dryness to obtain beta-piperidino-ethyl alpha-(para-xenyl)-propionate as a clear oily compound. This product was dissolved in 75 milliliters of ethyl ether and gaseous hydrogen chloride bubbled therethrough to form beta-piperidino-ethyl alpha-(para-xenyl)-propionate hydrochloride. This compound precipitated from solution and was recovered by filtration as 3.3 grams of white crystals melting at 162°–164° C.

Example 3

By substituting other suitable reactants for those shown in the preceding examples, closely related compounds have been prepared. The following are representative:

Beta - piperidino - ethyl alpha - (para - xenyl)-phenyl-acetate hydrochloride melting at 147°–149° C. This compound was prepared by reacting together alpha-(para-xenyl)-phenyl-acetic acid and beta-piperidino-ethyl chloride.

Gamma-piperidino-propyl alpha-(para-xenyl)-phenyl-acetate hydrochloride melting at 103°–105° C. This compound was prepared by reacting alpha - (para - xenyl) - phenylacetic acid with gamma-piperidino-propyl chloride.

Beta - piperidino - ethyl alpha - (para - xenyl)-cyclo - hexylacetate hydrochloride melting at 179°–181° C. This compound was prepared by the reaction of beta-piperidino-ethyl chloride with alpha-(para-xenyl)-cyclohexylacetic acid.

Gamma - piperidino - propyl alpha - (para-xenyl) - propionate hydrochloride melting at 142°–144° C. This compound was prepared by reacting together alpha-(para-xenyl)-propionic acid and gamma-piperidino-propyl chloride.

Beta-piperidino-ethyl alpha-(para-xenyl)-normal-butyrate hydrochloride melting at 146–148° C. This compound was prepared by reacting together beta-piperidino-ethyl chloride and alpha-(para-xenyl)-normal butyric acid.

Beta-piperidino-ethyl alpha-(para-xenyl)-normal-pentanoate hydrochloride melting at 127°–129° C. This compound was prepared by reacting beta-piperidino-ethyl chloride with alpha-(para-xenyl)-normalpentanoic acid.

In a similar fashion alpha-(para-xenyl)-normalhexanoic acid may be reacted with omega-piperidino-alkyl halides to obtain such compounds as beta-piperidino-ethyl alpha-(para-xenyl)-normalhexanoate and its hydrochloride. By substituting other omega-piperidino-alkyl halides for those shown in the foregoing examples, compounds such as delta-piperidino-normalbutyl alpha-(para-xenyl)-propionate and its hydrobromide, hydroiodide, and hydrochloride may be formed.

Other salts which may be prepared by reacting the free omega-piperidino-alkyl esters obtained in accordance with the teaching of the preceding examples with suitable acids and acid anhydrides include beta-piperidino-ethyl para-xenyl-acetate hydrobromide, gamma-piperidino-propyl alpha-(para - xenyl) - phenylacetate metho - sulfate, gamma-piperidino-propyl alpha-(para-xenyl)-propionate acetate, gamma-piperidino-propyl alpha-(para-xenyl)-propionate neutral sulfate, beta - piperidino - ethyl alpha - (para - xenyl)-phenylpropionate tartrate, beta-piperidino-ethyl alpha - (para - xenyl) - propionate hydroiodide, beta-piperidino-ethyl alpha-(para-xenyl)-normalhexenoate Δ-4 hydrochloride, etc.

While the foregoing examples have been primarily concerned with the preparation of omega-piperidino-alkyl esters and their salts, closely related derivatives falling within the scope of the present invention may be obtained through similar operation with omega-morpholino-alkyl halides and alcohols, omega-piperazino-alkyl halides and alcohols, and omega-thiomorpholino-alkyl halides and alcohols. By reacting such compounds with the para-xenyl-acetic and alpha - (para-xenyl) - hydrocarbon substituted acetic acids and acid chlorides as described for the corresponding piperidino compounds, the following basic-alkyl esters and their salts may be obtained: beta - piperazino - ethyl para - xenyl-acetate, gamma-piperazino-propyl para-xenyl-acetate hydrochloride, beta - piperazino - ethyl alpha-(para-xenyl)-phenylacetate hydrobromide, delta - piperazino - normalbutyl alpha - (para-xenyl)-cyclohexylacetate hydrochloride, beta-piperazino-ethyl alpha-(para-xenyl)-propionate, beta-piperazino-ethyl alpha-(para-xenyl)-normalbutyrate hydrochloride, beta - piperazino-ethyl alpha-(para-xenyl)-normalhexanoate hydrochloride, beta-morpholino-ethyl para-xenyl-acetate hydrochloride, gamma - morpholino-propyl alpha-(para-xenyl)-phenylacetate hydrochloride, beta-morpholino-ethyl alpha-(para-xenyl)-cyclohexylacetate hydroiodide, deltamorpholino-normalbutyl alpha - (para-xenyl) - propionate hydrochloride, beta - morpholino-ethyl alpha - (para - xenyl)-normal-pentanoate hydrochloride, beta-thiomorpholino-ethyl para-xenyl-acetate hydrochloride, gamma-thiomorpholino-propyl alpha-(para-xenyl)-propionate, beta-thiomorpholino-ethyl alpha-(para-xenyl)-normalhexanoate hydrobromide, delta-thiomorpholino-normalbutyl alpha-(para-xenyl)-phenylacetate hydrochloride, beta - thiomorpholino-ethyl alpha-(para-xenyl) cyclohexylacetate hydrochloride, etc.

Especially preferred embodiments of the present invention are the omega-piperidino-alkyl alpha - (para - xenyl) - propionates and normal-butyrates and particularly the hydrochlorides thereof. While all of the compounds herein disclosed are adapted to be employed as active constituents of antispasmodic compositions, the indicated propionate and butyrate derivatives have been found to be exceptionally effective. Representative of the results obtained with these derivatives is the effect exerted upon isolated rabbit jejunum according to the technique of Magnus. Thus, beta-piperidino-ethyl alpha-(para-xenyl)-propionate hydrochloride at a dilution of between 1 to 2,000,000 and 1 to 4,000,000 in water was effective in relaxing the unstimulated jejunal segment. Gamma - piperidino-propyl alpha - (para - xenyl)-propionate hydrochloride was effective at a dilution of between 1 to 500,000 and 1 to 1,000,000. Beta-piperidino-ethyl alpha-(para-xenyl)-normalbutyrate hydrochloride was effective at a dilution of between 1 to 400,000 and 1 to 1,000,000.

I claim:
1. A compound selected from the group consisting of (a) basic-alkyl esters of the formula

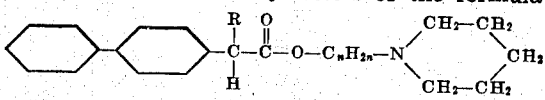

wherein R is selected from the group consisting of hydrogen and hydrocarbon radicals, and $n$ is an integer from 2 to 4, inclusive, and (b) acid and quaterary ammonium addition salts thereof.

2. A basic-alkyl ester hydrochloride of the formula

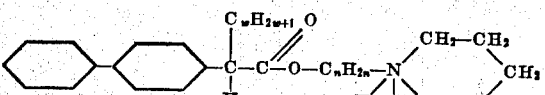

wherein $w$ represents an integer from 1 to 4, inclusive, and $n$ is an integer from 2 to 4, inclusive.

3. A basic-alkyl ester hydrochloride of the formula

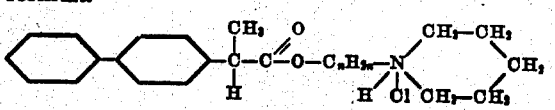

wherein $n$ is an integer from 2 to 4, inclusive.

4. A basic-alkyl ester hydrochloride of the formula

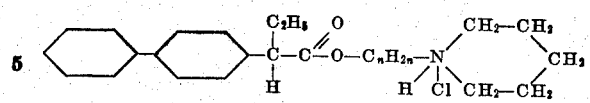

wherein $n$ is an integer from 2 to 4, inclusive.

5. A basic-alkyl ester hydrochloride of the formula

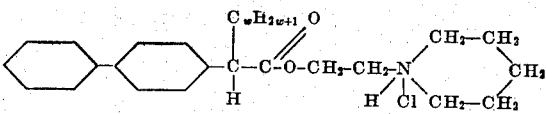

wherein $w$ represents an integer from 1 to 4, inclusive.

6. A basic-alkyl ester hydrochloride of the formula

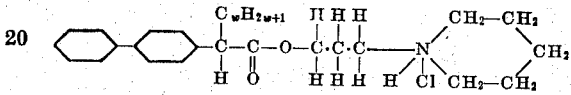

wherein $w$ represents an integer from 1 to 4, inclusive.

7. Beta - piperidino-ethyl alpha-(para-xenyl)-propionate hydrochloride having the formula

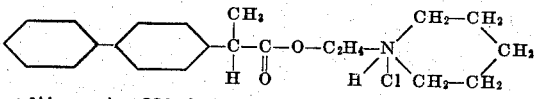

melting at 162°–164° C.

8. Gamma - piperidino - propyl alpha - (para-xenyl) - propionate hydrochloride having the formula

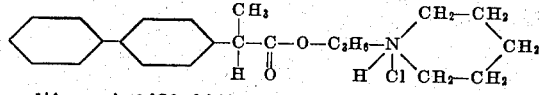

melting at 142°–144° C.

FREDERICK F. BLICKE.

REFERENCES CITED

The following references are of record in the file of this patent:

UNITED STATES PATENTS

| Number | Name | Date |
|---|---|---|
| 2,079,962 | Miescher, et al. | May 11, 1937 |
| 2,387,879 | Burtner | Oct. 30, 1945 |
| 2,390,555 | Richardson | Dec. 15, 1945 |

OTHER REFERENCES

J. Am. Chem. Soc., vol. 65, pp. 262–7 and 1582–5.
J. Am. Chem. Soc., vol. 64, pp. 970–3.
J. fur Prat. Chemie (2), vol. 81, (1910) p. 395.
J. Am. Chem. Soc., vol. 65, (Sept. 1943) pp. 1725–28.
J. Am. Chem. Soc., vol. 64, pp. 428–433.